(12) United States Patent  (10) Patent No.: US 7,539,566 B2
Tange et al.  (45) Date of Patent: May 26, 2009

(54) LANE DEPARTURE PREVENTION SYSTEM

(75) Inventors: Satoshi Tange, Kanagawa (JP); Shinji Matsumoto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 514 days.

(21) Appl. No.: 11/313,046

(22) Filed: Dec. 20, 2005

(65) Prior Publication Data

US 2006/0149448 A1  Jul. 6, 2006

(30) Foreign Application Priority Data

Dec. 21, 2004  (JP) .............................. 2004-370096

(51) Int. Cl.
*B62D 6/00* (2006.01)
(52) U.S. Cl. ......................... 701/41; 701/300
(58) Field of Classification Search ............ 701/41, 701/300–302, 1
See application file for complete search history.

(56) References Cited

U.S. PATENT DOCUMENTS

| 4,437,533 | A | 3/1984 | Bierkarre et al. |
| 5,913,375 | A | 6/1999 | Nishikawa |
| 6,185,492 | B1 | 2/2001 | Kagawa et al. |
| 6,748,302 | B2 * | 6/2004 | Kawazoe .................... 701/1 |

| 2004/0186651 | A1 | 9/2004 | Tange et al. |
| 2005/0004731 | A1 | 1/2005 | Bohm et al. |

FOREIGN PATENT DOCUMENTS

| DE | 101 37 292 A1 | 3/2003 |
| DE | 103 16 413 A1 | 10/2004 |
| JP | 9142327 | 6/1997 |
| JP | 2000033860 | 2/2000 |
| JP | 2004284484 | 10/2004 |
| JP | 2004287814 | 10/2004 |

OTHER PUBLICATIONS

EP Search Report No. 05257835.8-2423 dated Apr. 19, 2006.

* cited by examiner

*Primary Examiner*—Yonel Beaulieu
(74) *Attorney, Agent, or Firm*—Young Basile

(57) ABSTRACT

A lane departure prevention system comprises a traveling status detecting unit for detecting current lateral displacement and current yaw angle of a vehicle relative to a lane of travel, a departure detecting unit for detecting whether the vehicle is tending to depart from the lane of travel on the basis of current lateral displacement of the vehicle relative to the lane of travel as detected by the traveling status detecting unit; and a departure avoidance control unit for controlling the vehicle to avoid lane departure when the departure detecting unit detects that the vehicle is tending to depart from the lane of travel. The departure avoidance control unit calculating the extent of control necessary to avoid lane departure on the basis of current yaw angle of the vehicle detected by the traveling status detecting unit. Provision is made for preventing lane departure on a curving as well as a straight road.

12 Claims, 11 Drawing Sheets

LANE DEPARTURE PREVENTION SYSTEM

RELATED APPLICATION

The disclosure of Laid Open Japanese Patent No. 2004-370096, filed on Dec. 21, 2004, including the specification, drawings and claims, is incorporated herein by reference in its entirety.

FIELD

Described herein is a system for preventing departure of a vehicle from a lane of travel when the vehicle is about to depart from the lane.

BACKGROUND

In conventional systems, a vehicle is prevented from departing from its current lane of travel, for example, by determining whether there is a possibility that the vehicle will depart from the lane, and activating a steering actuator if there is such a possibility, thereby providing assisted steering power in a direction to avoid lane departure.

In addition, in conventional technology, a vehicle is prevented from departing from a lane by controlling a braking power actuator on the basis of a certain amount of lateral displacement of the vehicle from its previous position of travel, to provide braking power to the wheel(s) on the side of the vehicle opposite to the direction of lane departure.

Generally, in such a vehicle departure prevention system, when it is to be determined whether the vehicle is tending to depart from the lane of travel, a judgment is made based on whether the vehicle will depart from the lane in the near future, such as after the lapse of a predetermined period of time. Here, it may be regarded that a vehicle departs from a lane if all the wheels of the vehicle are outside the lane. Therefore, a vehicle may be tending to depart from the lane even when at least one of left and right side wheels crosses the lane unless all the wheels are outside the lane.

As a result, for example, when the yaw angle of the vehicle is large with respect to the lane of travel, the control operation for avoiding departure from the lane may be performed at a time when the vehicle is positioned well inside the lane marker position;, that is, in the vicinity of the center of the lane of travel. (The "yaw angle" is defined as the angle between the direction of travel of the vehicle and the direction of the lane.) Accordingly, the area in the lane in which the driver can freely steer the vehicle without the control operating to avoid departure from the lane becomes narrower as the width of the lane becomes smaller, so that in some cases, the driver may feel the control operation is performed prematurely.

The present lane departure prevention system does not make the driver feel the controlling operation is premature, regardless of the yaw angle, and so it does not discomfort the driver.

The present lane departure prevention system monitors whether a vehicle is tending to depart from the lane of travel based on current lateral displacement of the vehicle relative to the lane of travel, which is detected by a traveling status detecting unit. When it is determined that the vehicle is tending to depart from the lane of travel, the system allows a departure avoidance control unit to control motion of the vehicle to avoid the lane departure. The degree to which vehicle motion is controlled by the departure avoidance control is calculated based on the current yaw angle.

The present lane departure prevention system does not determine that the vehicle is tending to depart from the lane until the amount of lateral displacement reaches a predetermined value, and so it is possible to prevent the driver from feeling that the controlling operation is premature. In addition, since the degree to which the vehicle is to be controlled by the departure avoidance control is calculated based on the current yaw angle when it is determined that the vehicle is tending to depart from the lane of travel, it is possible to obtain a control effect by the departure avoidance control by, for example, estimating a future departure status of the vehicle from the lane of travel based on the current yaw angle and calculating the degree of control based on the estimated future lane departure status.

BRIEF DESCRIPTION OF THE DRAWINGS

For a more complete understanding of the present lane departure prevention system, reference is now made to the following description taken in conjunction with the accompanying drawings, in which.

DETAILED DESCRIPTION OF THE ILLUSTRATED EMBODIMENTS

The following description refers to specific embodiments of the present lane departure prevention system. While the claims are not limited to such embodiments, an appreciation of various aspects of the structure is best gained through a discussion of various examples thereof.

Figure 1:
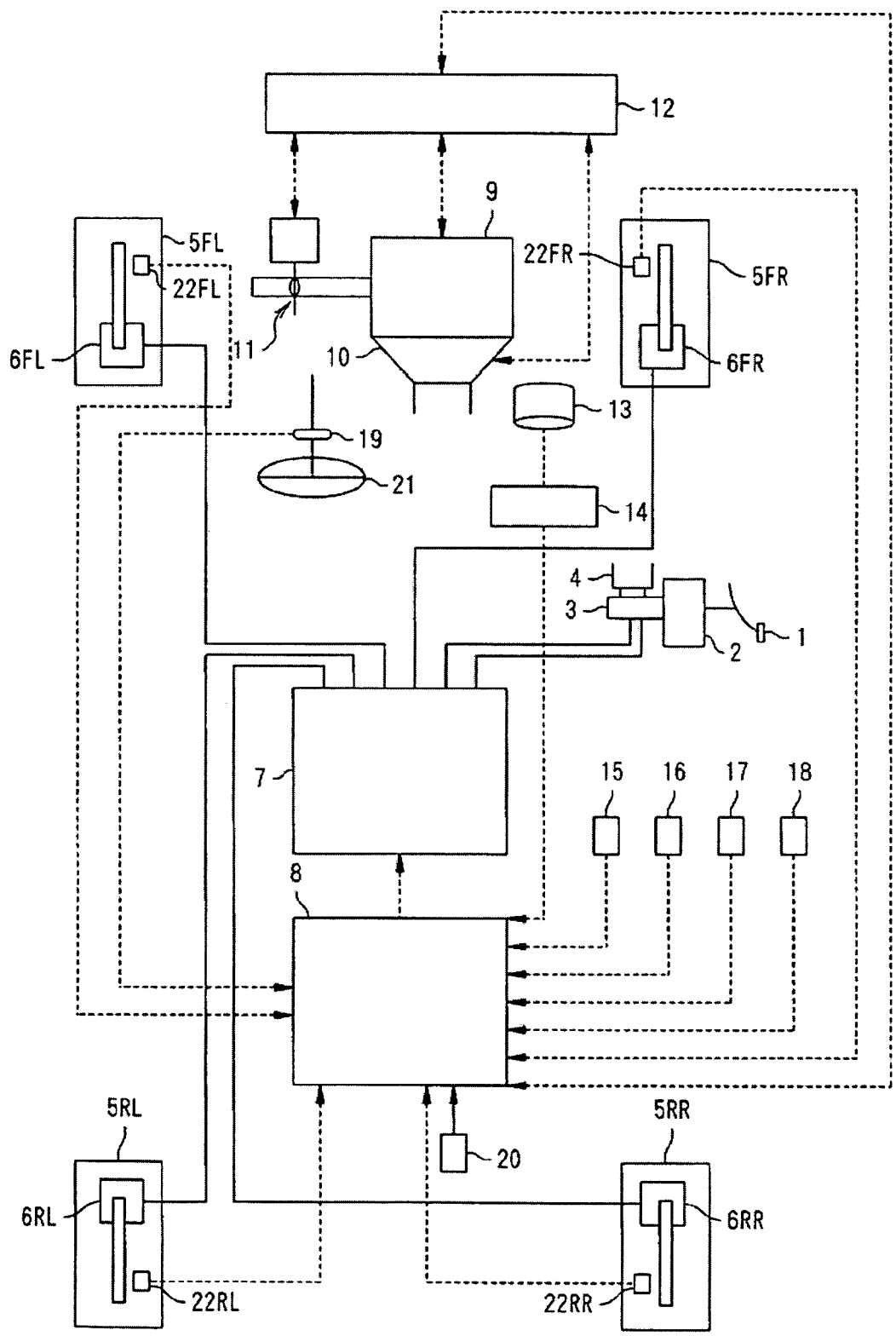
FIG. 1 is a schematic structural diagram illustrating an example of a vehicle in which the present lane departure prevention system is installed.

FIG. 1 is a schematic structural diagram illustrating an example of a vehicle in which the present lane departure prevention system is installed. The vehicle, which is a rear-wheel drive vehicle, is equipped with an automatic transmission and a conventional differential gear. A braking system of the vehicle can independently control the braking power of left and right wheels of the front and rear ends.

As shown in FIG. 1, the braking system comprises a brake pedal 1, a booster 2, a master cylinder 3, and a reservoir 4. Generally, braking fluid pressure boosted by the master cylinder 3 is supplied to wheel cylinders 6FL to 6RR of respective wheels 5FL to 5RR according to the degree of depression of the brake pedal 1 by a driver. However, a braking-fluid-pressure control circuit 7 may be provided between the master cylinder 3 and the respective wheel cylinders 6FL to 6RR, and the braking fluid pressures of the respective wheel cylinders 6RL to 6RR may be individually controlled by the braking-fluid-pressure control circuit 7.

For example, a braking-fluid-pressure control circuit used for antiskid control or traction control may be used for the braking-fluid-pressure control circuit 7. In the present embodiment, the braking-fluid-pressure control circuit can independently boost up and reduce the braking fluid pressures of the respective wheel cylinders 6FL to 6RR. The braking-fluid-pressure control circuit 7 controls the braking fluid pressures of the respective wheel cylinders 6FL to 6RR according to the value of a braking-fluid-pressure command sent from a control unit 8, which is described below.

The vehicle is provided with a drive torque control unit 12 for controlling drive torques of the rear wheels 5RL and 5RR, the drive wheels, by controlling the operational status of an engine 9, a selected speed-change ratio of an automatic transmission 10, and the throttle opening of a throttle valve 11. The operational status of the engine 9 can be controlled, for example, by controlling the volume of fuel injection or ignition timing, and can also be controlled by adjusting the throttle opening.

The drive torque control unit 12 alone can control the drive torques of the rear driving wheels 5RL and 5RR, but can control the drive torques by referring to the drive torque command value when it is introduced from the control unit 8.

The vehicle is further equipped with a monocular camera 13 having a CCD camera, etc. and a camera controller 14, as a front outside sensor for detecting the position of the vehicle in the lane of travel in order to determine whether or not the vehicle is departing from the lane. The camera controller 14 can detect a lane marker such as a white line from an image of the front side of the vehicle taken by the monocular camera 13, thereby detecting the lane of travel, and can also calculate the yaw angle $\phi$ of the vehicle, the lateral displacement X of the vehicle from the center of the lane, road curvature $\rho$ (=1/R, where R is a turn radius) of the lane, the width W of the lane, and the like, according to well-known procedure.

For example, as described in Japanese Laid Open Patent Application Publication No. H11-296660, the camera controller 14 detects the lane of travel in accordance with well-known procedure by, for example, detecting the lane markers and then calculating data of the lane of travel.

The vehicle further includes an acceleration sensor 15 for detecting forward acceleration Xg and lateral acceleration Yg of the vehicle, a yaw rate sensor 16 for detecting a yaw rate $\gamma$ of the vehicle, a master cylinder pressure sensor 17 for detecting output pressure; that is, so-called master cylinder pressure Pm, an accelerator opening sensor 18 for detecting the degree of depression of the accelerator pedal; that is, the degree of opening Acc of the accelerator, a steering angle sensor 19 for detecting the steering angle $\theta$ of a steering wheel 21, wheel speed sensors 22FL to 22RR for detecting rotational speeds of the respective wheels 5FL to 5RR; that is, wheel speeds Vwi (where i=FL to RR), and a direction indicator switch 20 for detecting direction indication operation of a direction indicator, these detection signals being directed to the control unit 8.

In addition, directed to the control unit 8 are data such as the yaw angle $\phi$ of the vehicle detected by the camera controller 14, the lateral displacement X of the vehicle from the center of the lane of travel, the road curvature $\rho$ of the lane, the width W of the lane, and the drive torque Tw on a wheel axis controlled by the drive torque control unit 12.

When the detected data of the traveling status of the vehicle includes left and right directionalities, it is supposed that the left direction is plus or positive and the right direction is minus or negative. That is, the yaw rate $\gamma$, the lateral acceleration Yg, the steering angle $\theta$, and the yaw angle $\phi$ have a positive value when the vehicle turns to the left, and have a negative value when the vehicle turns to the right. The lateral displacement X has a plus or positive value when the vehicle departs to the left from the center of the lane of travel and a minus or negative value when the vehicle departs to the right from the center of the lane of travel.

A computing process executed by the control unit 8 will now be described with reference to the flowchart of FIG. 2. The computing process is executed by means of timer interruption every predetermined sampling period of time $\Delta T$ (for example, 10 ms). Although a communication step is not specifically provided in the flowchart, the information obtained through the computing process is updated and stored in a storage device on an as-needed basis and necessary information is read out from the storage device at any time on an as-needed basis.

First, in step S1 of the computing process, information is read out as detected by the respective sensors, such as the traveling acceleration Xg, the lateral acceleration Yg, the yaw rate $\gamma$, the wheel speeds Vwi, the degree of opening of the accelerator Acc, the master cylinder pressure Pm, the steering angle $\theta$, the direction indicator switch signal, the yaw angle $\phi$ of the vehicle from the camera controller 14, the lateral displacement X of the vehicle from the center of the lane of travel, the road curvature $\rho$ of the lane, the width W of the lane, and the drive torque Tw on the wheel axis from the drive torque control unit 12.

The forward speed V of the vehicle is calculated from an average value of the rotational speeds VwFL and VwFR of the left and right front wheels, which are non-driving wheels, among the wheel speeds Vwi (where i=FL to RR).

Although as described above, forward speed V is calculated based on the front left and right wheel speeds VwFL and VwFR, for example, when antiskid control is performed by an ABS control means installed in the vehicle, vehicle speed estimated in the process of the antiskid control may be used.

Next, in step S2, the lateral displacement X of the vehicle from the center of the lane of travel, which is obtained from the camera controller 14, is set as the current lateral displacement Xs of the vehicle relative to the lane.

The value of the lateral displacement X is zero at the center of the lane of travel, is plus or positive when the vehicle departs to the left from the center of the lane of travel, and is minus or negative when the vehicle departs to the right from the center of the lane of travel.

Next, in step S3, it is determined whether the vehicle has a current tendency to depart from the lane of travel.

The lane departure monitoring is performed by comparing the lateral displacement Xs set in step S2 with a departure threshold value Xc. Specifically, when Xs≧Xc, it is determined that the vehicle is departing to the left from the lane of travel and a departure flag FLD is set to "LEFT". When Xs≦−Xc, it is determined that the vehicle is departing to the right from the lane of travel and the departure flag FLD is set to "RIGHT". When Xs≧Xc and Xs≦−Xc are not satisfied, it is determined that the vehicle is not departing from the lane of travel and the departure flag FLD is set to "OFF".

Since the departure threshold value Xc is a constant value, and the lane width of a highway is, for example, about 3.5 m in Japan, the departure threshold value Xc may be set to 0.8 m. Actually, the smaller of the value of 0.8 m and a value obtained by subtracting half of the width of the vehicle from half of the width W of the lane of travel may be used as the lane departure threshold value. The value of Xc is not limited thereto, and may be set so that it is determined that the vehicle is tending to depart from the lane even when at least one of wheels of the vehicle is outside the lane.

In addition, when one of wheels of the vehicle encounters a lane maker, it may be determined that the vehicle is departing from the lane of travel so that a departure flag FLD may be set to "LEFT" or "RIGHT."

Although as described above, the departure flag FLD is set by comparing the lane lateral displacement Xs with the departure threshold value Xc, the flag FLD may be set by further considering whether the driver is intending to change lanes.

For example, it is determined whether a direction indicator switch 20 is in the ON state, and when it is in the ON state, it is determined whether the indication direction of the direction indicator switch 20 is in agreement with the lane departing direction specified by the lateral displacement Xs calculated in step S2. When the directions are conformed to each other, it is determined that a change of lanes is being carried out and if the departure flag FLD is set to "ON" as the comparison result of the lateral displacement Xs and the departure threshold value Xc, the departure flag is changed to "OFF". On the other hand, when the indication direction of the direction indicator switch 20 is not in agreement with the lane departing direction specified by the lateral displacement Xs, it is determined that a change of lanes is not being carried out and the value of the departure flag FLD, which is set according to the comparison result of the lateral displacement Xs and the departure threshold value Xc, is maintained without change.

After the direction indicator switch 20 is switched to the OFF state from the ON state, it is determined that the vehicle is in a transient state of lane change until a predetermined period of time passes, so that the process for the ON state is performed even though the direction indicator switch 20 is in the OFF state. When a predetermined period of time passes after the direction indicator switch 20 is switched to the OFF state from the ON state, the change of lanes is regarded as completed, and after that, the process is performed according to the status of the direction indicator switch 20.

The predetermined period of time is set to, for example, four (4) seconds, from the time at which the direction indicator switch 20 is switched to the OFF state at a later stage of the change of lanes, during which the position of the vehicle can be regarded as reaching the vicinity of the center of a destination lane.

Next, in step S4, a reference Msb is calculated, which is a reference of the yaw moment or extent of control necessary to avoid lane departure.

Specifically, when the departure flag FLD is set to "LEFT", the reference yaw moment Msb is calculated from Equation 1 below. When the departure flag FLD is set to "RIGHT", the reference yaw moment Msb is calculated from Equation 2. When the departure flag FLD is set to "OFF", it is determined that the vehicle is not departing from the lane of travel so that the reference yaw moment Msb is set to zero, that is, Msb=0. since it is not necessary to generate the yaw moment.

$$Msb = -K1 \times K2 \times (Xs - Xc) \quad (1)$$

$$Msb = -K1 \times K2 \times (Xs + Xc) \quad (2)$$

In Equations 1 and 2, K1 is a constant determined as a vehicle specification. K2 is a proportional coefficient determined in accordance with the forward speed V of the vehicle. For example, when the value of the forward speed V is relatively high, the reference yaw moment Msb is suppressed by setting the proportional coefficient K2 to a relatively small value to avoid unstable vehicle response to a large yaw moment at a time of high-speed traveling. In the opposite circumstance, when the value of the forward speed V is relatively small, the sufficient reference yaw moment Msb is obtained by setting the proportional coefficient to a relatively large value so that rapid recovery from the departing state can be accomplished by generating the yaw moment.

Next, in step S5, a yaw angle response gain Kφ is calculated. The yaw angle response gain Kφ is a gain for calculating a target yaw moment Ms corresponding to the yaw angle φ by multiplying the reference yaw moment Msb calculated in step S4, as described below. The yaw angle response gain Kφ is set based on the yaw angle φ of the vehicle to increase as the yaw angle φ increases in the lane departing direction.

Figure 3A:
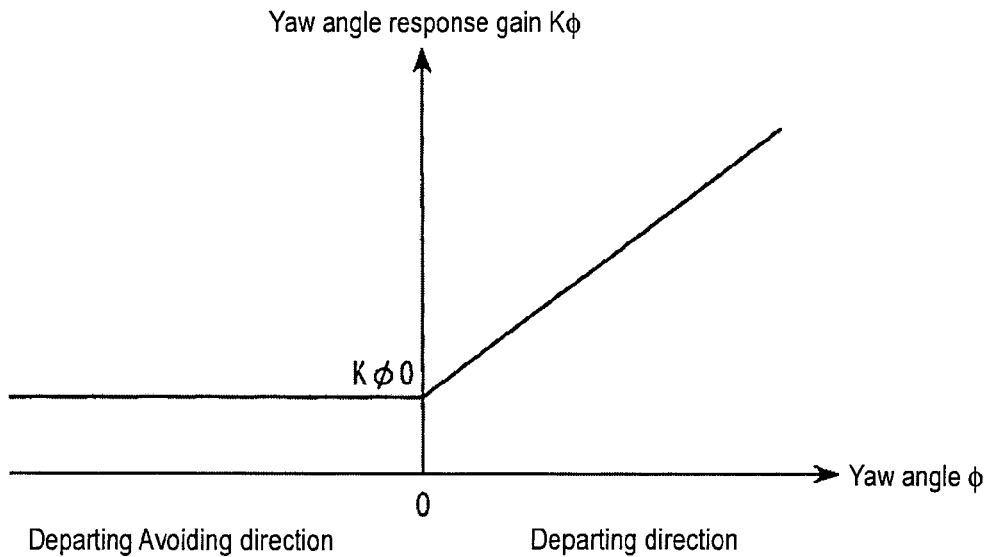
FIG. 3 is an example of a control chart showing the relationship between a yaw angle $\phi$ and a yaw-angle response gain $K\phi$.

Specifically, when the departure check result FLD is "LEFT", the yaw angle response gain Kφ corresponding to the yaw angle φ is calculated, for example, from the control chart of FIG. 3A. On the other hand, when the departure check result FLD is "RIGHT", the yaw angle response gain Kφ calculated, for example, according to the control chart of FIG. 3B.

Here, the yaw angle φ has a plus or positive value when the yaw angle indicates the left direction, and a minus or negative value when the yaw angle indicates the right direction.

Figure 3B:
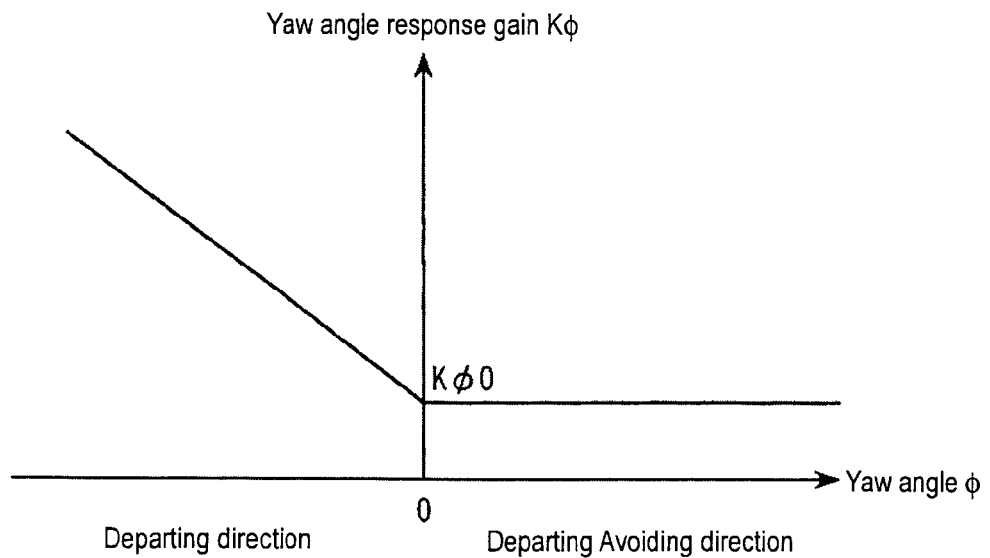

In FIGS. 3A and 3B, the abscissa axis is the yaw angle φ and the ordinate axis is the yaw angle response gain Kφ. As shown in FIGS. 3A and 3B, when the yaw angle φ is zero (0), the yaw angle response gain Kφ is set to an initial value Kφ0 which is greater than zero (for example, "1"). When the yaw angle φ is an angle in the lane departing direction, the yaw angle response gain Kφ increases from the initial value Kφ0 in proportion to the yaw angle φ as the value thereof becomes greater. In the opposite circumstance, when the yaw angle φ is an angle in a departure-avoiding direction, the yaw angle response gain Kφ is set to the initial value Kφ0 regardless of the magnitude of the yaw angle φ. The initial value Kφ0 is not limited to "1" but may be set to any value depending upon the control effect expected in the departure avoidance control.

As shown in FIG. 3, when the current yaw angle φ of the vehicle is an angle in the lane departing direction and it is estimated that the vehicle will tend to depart from the lane of travel in the future, the yaw angle response gain Kφ is set to a greater value as the yaw angle φ is relatively large. That is, as the tendency to depart increases, the target yaw moment Ms is set to a relatively large value, thereby generating a sufficient yaw moment; that is, sufficient extent of control of the vehicle. In the opposite circumstance, when the yaw angle φ is an angle in the direction in which the vehicle avoids departing from the lane of travel, Kφ is set to the initial value Kφ0 regardless of the magnitude of the yaw angle φ and the target yaw moment Ms is set to a relatively small value, thereby avoiding generation of an unnecessary yaw moment.

Figure 4A:
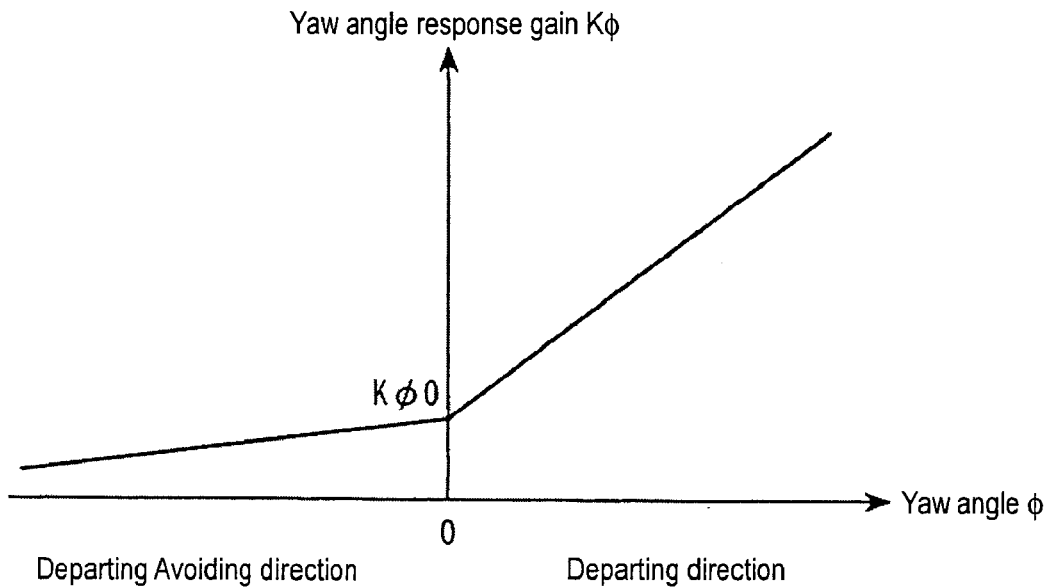
FIG. 4 is another example of a control chart showing the relationship between the yaw angle $\phi$ and the yaw-angle response gain $K\phi$.
Figure 4B:
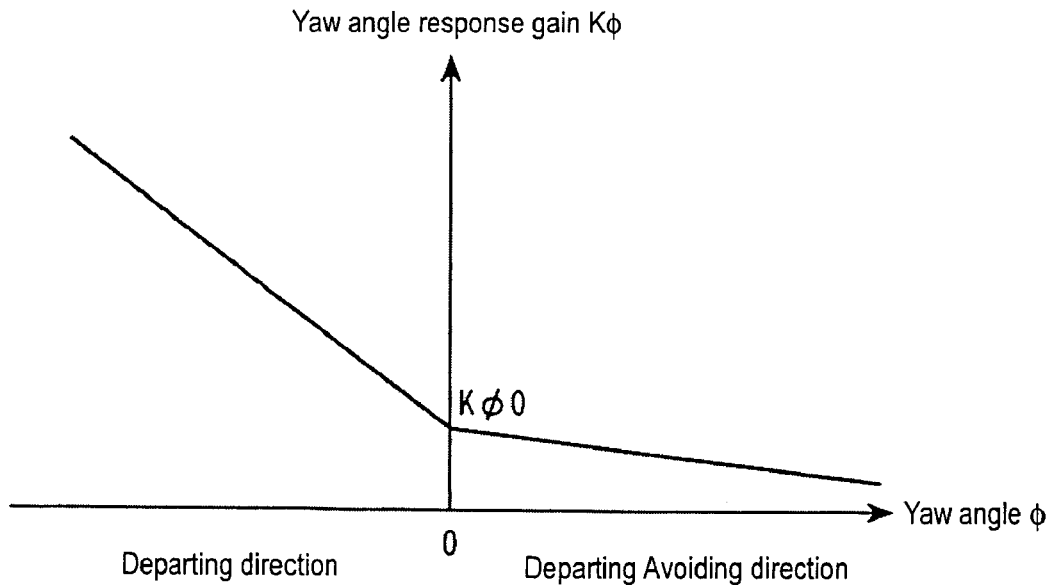

In addition, when the yaw angle φ is an angle in the departure-avoiding direction, the yaw angle response gain Kφ is set to the initial value Kφ0 regardless of the magnitude of the yaw angle φ, but the present system is not so limited. For example, as shown in FIGS. 4A and 4B, when the yaw angle φ is an angle in the departure-avoiding direction, the yaw angle response gain may be set to decrease from the initial value $K\phi0$ in inverse proportion to the yaw angle $\phi$. That is, when the yaw angle $\phi$ is an angle in the departure-avoiding direction, $K\phi$ is set to a smaller value as the yaw angle $\phi$ is relatively large in the departure-avoiding direction, that is, as yaw moment for changing the posture of the vehicle is not necessary, and the target yaw moment Ms is set to a relatively small value, thereby avoiding generation of the unnecessary yaw moment.

Figure 5A:
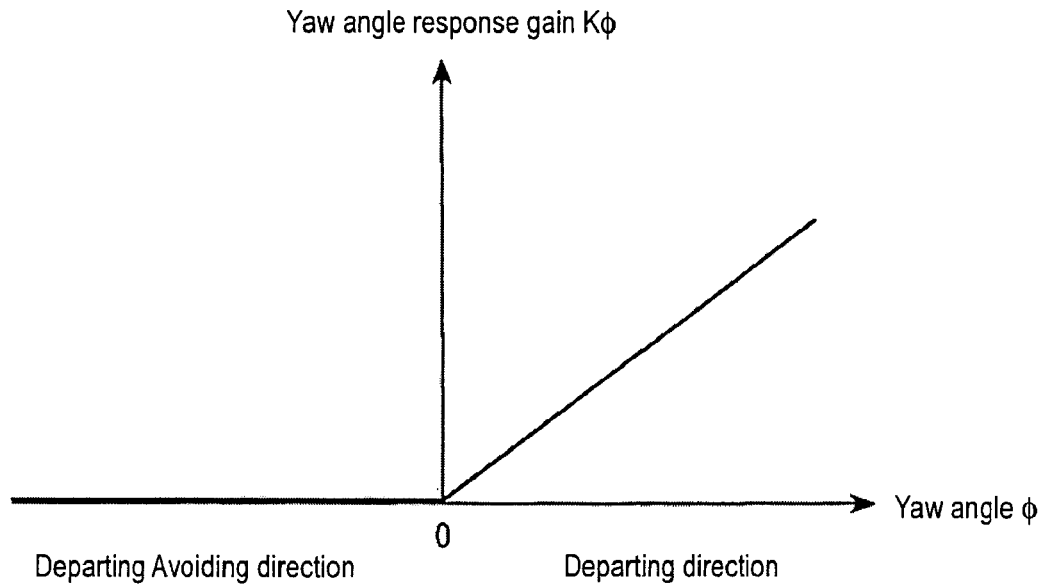
FIG. 5 is yet another example of a control chart showing the relationship between the yaw angle $\phi$ and the yaw-angle response gain $K\phi$.
Figure 5B:
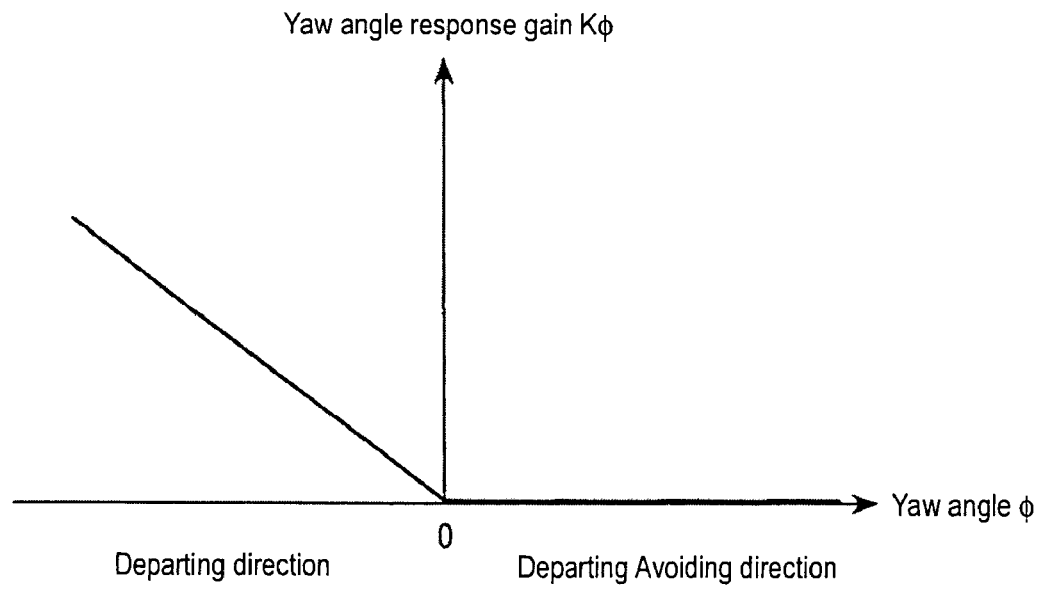

As shown in FIGS. 5A and 5B, the initial value of the yaw angle response gain $K\phi$ may be set to zero when the yaw angle $\phi$ is zero, the yaw angle response gain $K\phi$ may be set to increase in proportion to the yaw angle $\phi$ when the yaw angle $\phi$ is in the lane departing direction, and the yaw angle response gain $K\phi$ may be set to zero regardless of the magnitude of the yaw angle $\phi$ when the yaw angle $\phi$ is in the departure-avoiding direction. That is, when the yaw angle $\phi$ is an angle in the departure-avoiding direction, it is not necessary to generate a yaw moment. Accordingly, the yaw angle response gain $K\phi$ is set to zero and the target yaw moment Ms is set to zero, whereby no yaw moment is generated.

Next, in step S6, a road curvature response gain $K\rho$ is calculated. The road curvature response gain $K\rho$ is a gain for calculating a target yaw moment Ms corresponding to the road curvature $\rho$ of the lane of travel by multiplying the reference yaw moment Msb calculated in step S4, as described later,. The road curvature response gain $K\rho$ is set based on the road curvature $\rho$ of the lane of travel so as to increase as the road curvature $\rho$ is great, that is, as the curve of the lane of travel is sharp at the time of departure in the turn-outward direction.

Figure 6A:
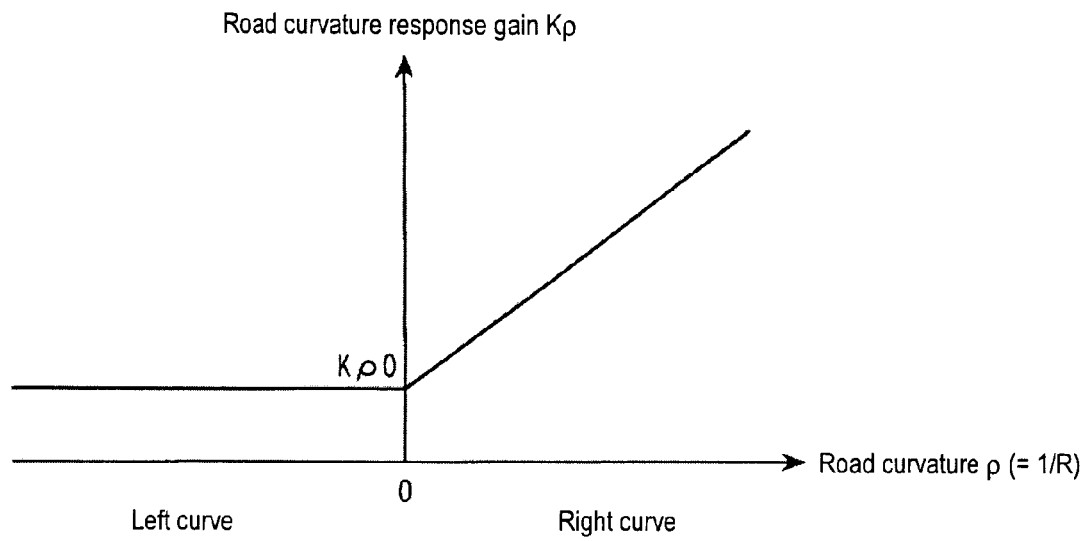
FIG. 6 is an example of a control chart showing the relationship between a road curvature $\rho$ and a road-curvature response gain $K\rho$ of a lane of travel.

Specifically, when the departure monitoring result FLD is "LEFT", the road curvature response gain $K\rho$ corresponding to the road curvature $\rho$ is calculated, for example, according to the control chart of FIG. 6A. On the other hand, when the departure monitoring result FLD is "RIGHT", $K\rho$ is calculated, for example, according to the control chart of FIG. 6B.

The road curvature $\rho$ of the lane of travel has a plus or positive value in the case of a curve to the right and a minus or negative value in the case of a curve to the left.

Figure 6B:
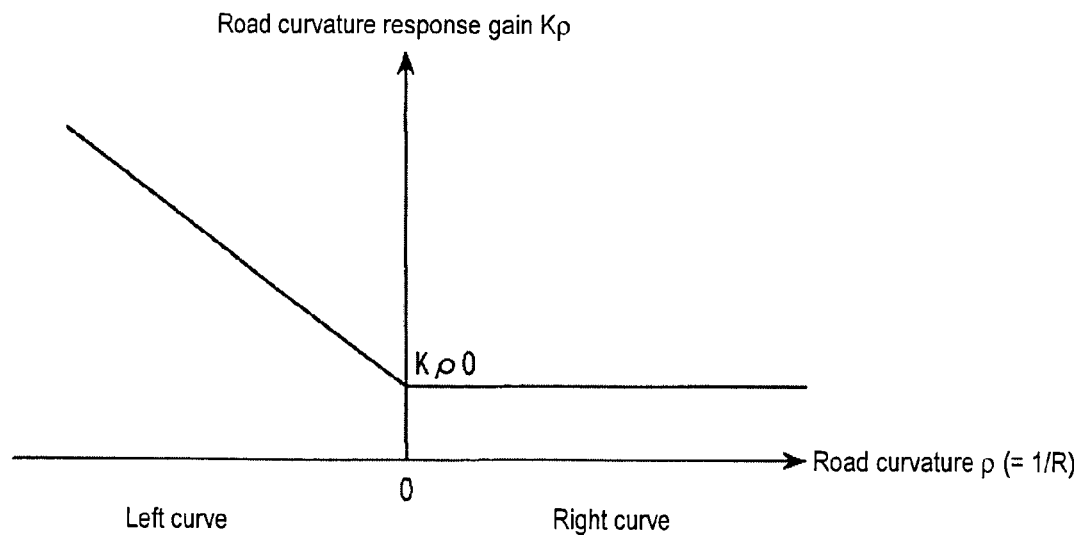

In FIGS. 6A and 6B, the abscissa axis is the road curvature $\rho$ of the lane of travel and the ordinate axis is the road curvature response gain $K\rho$. As shown in FIGS. 6A and 6B, when the road curvature $\rho$ of the lane of travel is zero, the road curvature response gain $K\rho$ is set to an initial value $K\rho0$ greater than zero (for example, "1"). When the direction of a curve is opposite to the lane departing direction and the vehicle is tending to depart in the turn-outward direction, $K\rho$ increases from the initial value $K\rho0$ in proportion to the road curvature $\rho$. In the opposite circumstance, when the direction of the curve is in the lane departing direction and the vehicle is tending to depart in the turn-inward direction, $K\rho$ is set to the initial value $K\rho0$ regardless of the magnitude of the road curvature $\rho$. The initial value $K\rho0$ is not limited to "1" but may be set to any value depending upon the control effect expected in the departure avoidance control.

As shown in FIG. 6, when the direction of the curve is inverse to the lane departing direction of the vehicle and the vehicle is tending to depart from the lane of travel, the road curvature response gain $K\rho$ is set to a greater value as the road curvature $\rho$ is great, that is, as the tendency of lane departure increases, and the target yaw moment Ms is set to a relatively large value, thereby generating a sufficient yaw moment. In the opposite circumstance, when the direction of the curve is in the lane departing direction and the vehicle has a slight tendency to depart from the lane of travel, the road curvature response gain $K\rho$ is set to the initial value $K\rho0$ regardless of the magnitude of the road curvature $\rho$ and the target yaw moment Ms is set to a relatively small value, thereby avoiding generation of an unnecessary yaw moment.

When the direction of the curve corresponds to the lane departing direction of the vehicle, the road curvature response gain $K\rho$ is set to the initial value $K\rho0$ regardless of the magnitude of the road curvature $\rho$, but the present system is not so limited.

Figure 7A:
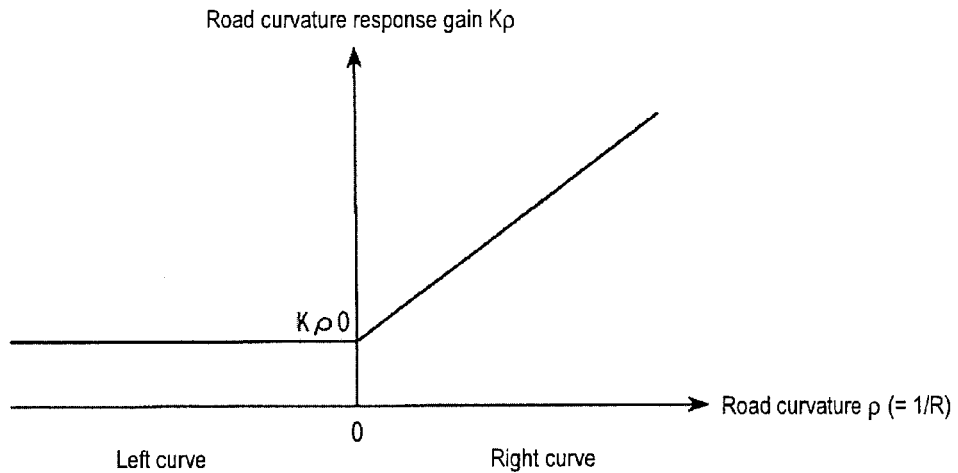
FIG. 7 is another example of a control chart showing the relationship between the road curvature $\rho$ and the road-curvature response gain $K\rho$ of a lane of travel.
Figure 7B:
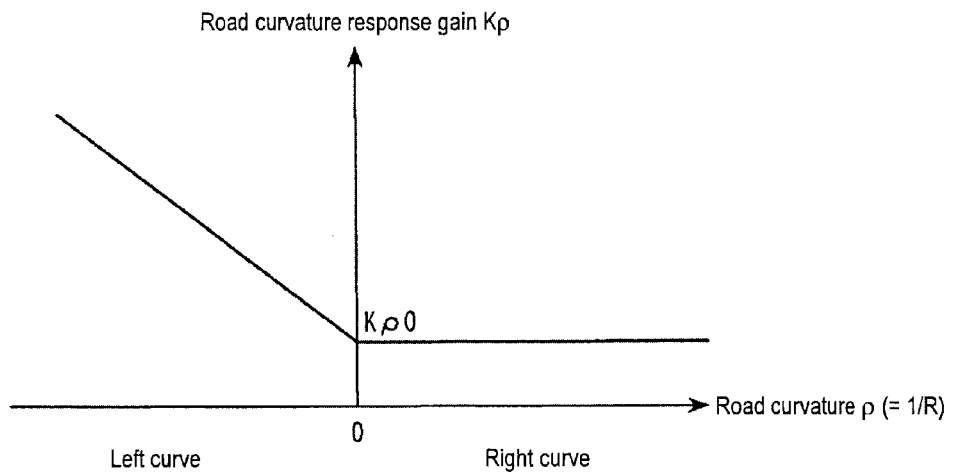

For example, as shown in FIGS. 7A and 7B, when the direction of the curve corresponds to the lane departing direction, the road curvature response gain $K\rho$ may be set to decrease from the initial value $K\rho0$ in inverse proportion to the road curvature $\rho$ of the lane of travel. That is, when the direction of the curve corresponds to the lane departing direction of the vehicle and the vehicle is tending to depart in the same direction as the curve, it is estimated that the vehicle has a slight tendency to depart from the lane of travel after a predetermined period of time has passed. In such a case, generation of an unnecessary yaw moment may be avoided by setting $K\rho$ to a smaller value as the road curvature $\rho$ of the lane of travel is great and the tendency of departing from the lane of travel is slight.

When the yaw angle response gain $K\phi$ and the road curvature response gain $K\rho$ are calculated, the target yaw moment Ms generated for avoiding lane departure is calculated in step S7. Specifically, as shown in Equation 3 below, the target yaw moment Ms is calculated by multiplying the reference yaw moment Msb calculated in step S4 by the yaw angle response gain $K\phi$ calculated in step S5 and the road curvature response gain $K\rho$ calculated in step S6.

$$Ms = Msb \times K\phi \times K\rho \quad (3)$$

Although it has been described above that the reference yaw moment Msb is multiplied by both the yaw angle response gain $K\phi$ and the road curvature response gain $K\rho$, the present system is not so limited. For example, the target yaw moment Ms may be calculated by selecting the greater of $K\phi$ and $K\rho$ and multiplying the reference yaw moment by only the selected one of these.

Next, in step S8, target braking fluid pressures Psi (where i=FL to RR) of the respective wheels are calculated as target braking powers for avoiding lane departure.

First, when the departure flag FLD is "OFF", it is not necessary to generate a yaw moment since the vehicle is not departing from the lane of travel. Accordingly, the target braking fluid pressures Psi (where i=FL to RR) of the respective wheels are calculated from Equation 4, by considering a master cylinder fluid pressure Pm which is generated by the braking action of the driver. In Equation 4 below, PmR represents a master cylinder fluid pressure for rear wheels calculated from the master cylinder fluid pressure Pm, where distribution to the front and rear wheels is considered.

$$PsFL = PsFR = Pm$$

$$PsRL = PsRR = PmR \quad (4)$$

On the other hand, when the departure flag FLD is "ON", the target braking fluid pressures Psi (where i=FL to RR) are calculated by considering the target yaw moment Ms calculated in step S7.

First, braking power differences $\Delta PsF$ and $\Delta PsR$ between the left and right wheels of the front and rear sets of wheels are calculated by dividing the cases based on the magnitude of the target yaw moment Ms. When the absolute value |Ms| of the target yaw moment is smaller than a predetermined threshold value Ms0 (|Ms|<Ms0), the braking power differences $\Delta PsF$ and ΔPsR between the front and rear wheels are calculated from Equation 5 below. On the other hand, when the absolute value |Ms| of the target yaw moment is greater than or equal to the predetermined threshold value Ms0 (|Ms|≧Ms0), the braking power differences ΔPsF and ΔPsR between the front and rear wheels are calculated from Equation 6.

If |Ms|<Ms0,

ΔPsF=0

ΔPsR=2×KbR×|Ms|/T    (5)

If |Ms|≧Ms0,

ΔPsF=2×KbF×(|Ms|−Ms0)/T

ΔPsR=2×KbR×Ms0/T    (6)

"T" in Equations 5 and 6 represents a tread. KbF and KbR represent conversion coefficients for converting the braking powers into braking fluid pressures and are constants determined by the brake specifications.

Then, the target braking fluid pressures Psi (where i=FL to RR) of the respective wheels are calculated in consideration of the lane departing direction and the master cylinder pressure Pm, which is generated by the braking action of the driver. Specifically, when the target yaw moment Ms is minus or negative, that is, when the vehicle is tending to depart to the left from the lane of travel, the target braking fluid pressures Psi are calculated from Equation 7.

PsFL=Pm

PsFR=Pm+ΔPsF

PsRL=PmR

PsRR=PmR+ΔPsR    (7)

On the other hand, when the target yaw moment Ms is greater than or equal to zero, that is, when the vehicle is tending to depart to the right from the lane of travel, the target braking fluid pressures Psi are calculated from Equation 8.

PsFL=Pm+ΔPsF

PsFR=Pm

PsRL=PmR+ΔPsR

PsRR=PmR    (8)

When the target braking fluid pressures Psi are calculated, the target braking fluid pressures Psi calculated in step S8 are directed to the braking fluid pressure control circuit 7 in step S9.

The vehicle may be provided with an alarm unit for alerting the driver when lane departure of the vehicle is detected by the control unit 8. In this case, when the departure flag FLD is "ON", the alarm unit can be actuated at the same time as the yaw moment is generated. The alarm unit may include, for example, a speaker for generating voices or buzzer sounds, or a monitor providing the alarm by the use of display information or voice information.

Figure 2:
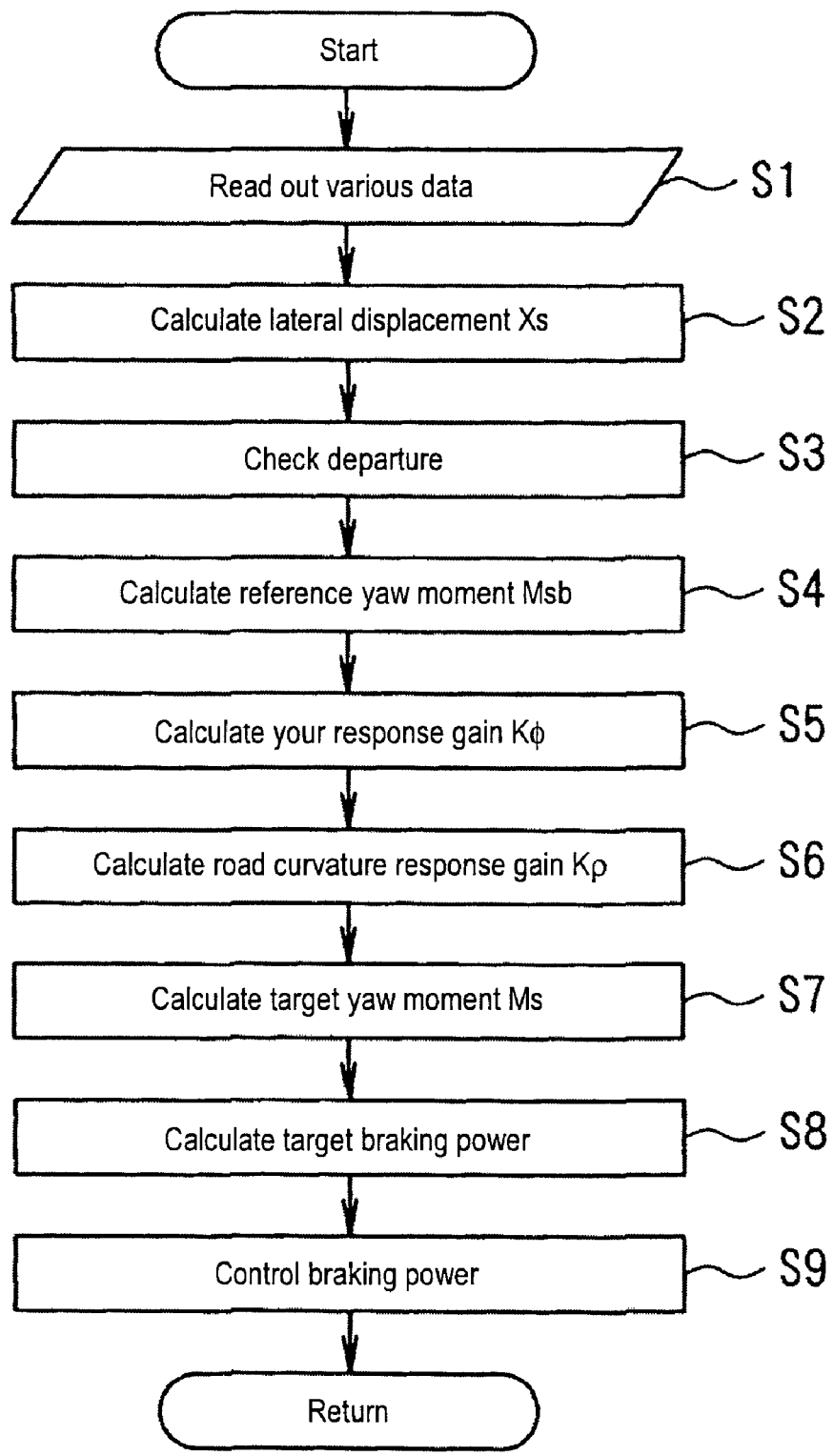
FIG. 2 is a flowchart illustrating an example of a computing process executed by a control unit of FIG. 1 according to a first embodiment.

The computing process shown in FIG. 2 is completed in this way. When a series of computing processes have been completed, the timer interruption process is ended and a predetermined main program is again performed.

When the vehicle travels straight ahead in the vicinity of the center of the lane of travel, the current lateral displacement calculated depending upon the traveling position of the vehicle at present is relatively small. Accordingly, the lateral displacement Xs is smaller than the departure threshold value Xc or greater than −Xc and the departure flag FLD is set to "OFF". As a result, the reference yaw moment Msb is set to zero (Msb=0) (steps S1 to S4).

Therefore, since the target yaw moment Ms becomes zero (Ms=0) (steps S5 to S7), the fluid pressure corresponding to the master cylinder pressure Pm is set as the target braking fluid pressure Psi in step S8 in the computing process shown in FIG. 2. As a result, no yaw moment is generated and thus the vehicle is controlled by the driver.

When the vehicle is tending to depart to the left and the lateral displacement Xs is smaller than the departure threshold value Xc, the departure flag FLD is set to "OFF". Accordingly, yaw moment is not generated.

When departure of the vehicle from the lane of travel continues and the lateral displacement Xs is greater than or equal to the departure threshold value Xc, the departure flag FLD is set to "LEFT" and the difference is calculated between the lateral displacement Xs and the departure threshold value Xc; that is, the reference yaw moment Msb corresponding to the lateral displacement of the vehicle.

At this time, since the vehicle is departing to the left from the lane of travel, the value corresponding to the yaw angle φ is set as the yaw angle response gain Kφ according to the control chart shown in FIG. 3A, when the yaw angle of the vehicle is in the lane departing direction, that is, in the left direction.

When the vehicle is traveling in a straight lane, the road curvature ρ of the lane of travel is approximately zero. Accordingly, the road curvature response gain Kρ is set to the initial value Kρ0 according to the control chart shown in FIG. 6A.

As a result, the final target yaw moment Ms is corrected based on the road curvature response gain Kρ and the yaw angle response gain Kφ corresponding to the yaw angle φ.

At this time, as shown in FIG. 3A, the yaw angle response gain Kφ is set to a greater value as the yaw angle φ increases in the lane departing direction. Therefore, when it is estimated that the yaw angle φ is large and thus the vehicle has a relatively strong tendency of departing from the lane of travel, the target yaw moment Ms is set to a large value and the sufficient yaw moment is generated in the direction decreasing the yaw angle φ of the vehicle, thereby accomplishing prevention of lane departure.

In the opposite circumstance, when the yaw angle φ is relatively small and it is estimated that the vehicle has a slight tendency to depart from the lane of travel at the time when a predetermined period of time has elapsed, the target yaw moment Ms is set to a relatively small value and a relatively small yaw moment corresponding to the yaw angle φ is generated, thereby accomplishing prevention of lane departure. In addition, excessive change of posture of the vehicle in the departure-avoiding direction due to the yaw moment being greater than necessary is avoided.

When the yaw angle of the vehicle is changed in the departure-avoiding direction by generating the target yaw moment Ms or allowing the driver to perform steering, the target yaw moment Ms decreases with decrease in yaw angle.

When the posture of the vehicle is changed in the departure-avoiding direction with the tendency to depart so that the yaw angle becomes an angle in the departure-avoiding direction, as shown in the control chart shown in FIG. 3A, the yaw angle response gain Kφ is set to the initial value Kφ0. That is, at this time, since the yaw angle is in the departure-avoiding direction, lane departure of the vehicle does not continue. Accordingly, even when the yaw moment has a relatively small value, there is no problem. In the opposite circumstance, it is possible to avoid the vehicle's tending to depart by generating a yaw moment greater than necessary in the departure-avoiding direction.

When the vehicle travels in a curved lane rather than a straight lane, the road curvature response gain Kρ is set based on the road curvature ρ of the lane of travel. At this time, for example, when the vehicle travels in a lane curved to the right and it is determined that the vehicle is tending to depart to the left, that is, when it is estimated that the vehicle has a relatively strong tendency of departing in the future, Kρ is set to a value corresponding to the road curvature ρ of the lane of travel according to the control chart shown in FIG. 6A. Accordingly, the target yaw moment Ms is set to a relatively large value, thereby generating enough yaw moment to avoid lane departure. At this time, as the road curvature ρ becomes greater, that is, as the curve becomes sharper, the road curvature response gain Kρ is set to a greater value and the target yaw moment Ms is calculated to generate a sufficient yaw moment. As a result, the necessary and sufficient yaw moment corresponding to the road curvature is generated.

In the opposite circumstance, when it is determined that the vehicle is tending to depart to the left while the vehicle travels in the lane curved to the left, the road curvature response gain Kρ is set to the initial value Kρ0 according to the control chart shown in FIG. 6A and the target yaw moment Ms is set to a relatively small value. At this time, since the vehicle is traveling in the curved lane, the actual tendency of lane departure during such travel is relatively slight even when the vehicle is tending to depart to the left. Accordingly, it is possible to generate the necessary and sufficient yaw moment based on travel status in the left-hand curve, without generating an unnecessarily large yaw moment.

As described above, in step S3 of FIG. 2, a tendency to depart from the lane is determined based on the current travel position of the vehicle, and when the vehicle is traveling in the area in which the lateral displacement Xs is smaller than or equal to the departure threshold value Xc, it is determined that the vehicle is not tending to depart from the lane.

When the lane departure check of the vehicle is performed by the use of an estimated lateral displacement, which is calculated using current lateral displacement or current yaw angle of the vehicle, after a predetermined time has passed, the estimated lateral displacement increases as the yaw angle increases. Accordingly, even when the vehicle is traveling in the vicinity of the center of the lane of travel, it can be determined whether the vehicle is tending to depart from the lane, depending upon the yaw angle. As a result, when the vehicle is traveling on a narrow road, it can be easily determined that the vehicle is tending to depart from the lane of travel and control interruption of the departure avoidance control can be easily carried out. Therefore, it is easy to hinder control by the driver, thereby making the driver uncomfortable.

However, as described above, at least in the case in which the current lateral displacement Xs is smaller than or equal to the departure threshold value Xc, control interruption of the departure avoidance control is not carried out. Accordingly, the range in which the driver alone can control driving operation can be made wide, thereby avoiding or reducing any discomfort of the driver.

At this time, the reference yaw moment, calculated based on current lateral displacement Xs, is corrected based on the yaw angle φ and the road curvature ρ of the lane of travel to generate a greater yaw moment as the tendency of lane departure in the future increases, it is estimated that time is required until the control effect due to control interruption of the departure avoidance control actually begins, and the yaw moment necessary for the avoidance of lane departure is generated in advance. Accordingly, it is possible with certainty to avoid departure of the vehicle from the lane of travel.

In the first embodiment, the camera controller 14 corresponds to the traveling status detecting means and the road curvature detecting means, steps S2 and S3 of FIG. 2 correspond to the departure detecting means, and steps S4 to S9 of FIG. 2 correspond to the departure avoidance control means.

The second embodiment is similar to the first embodiment, except that the computing process executed by the control unit 8 is different. In explaining the second embodiment, description of elements will be omitted when they are similar to corresponding elements of the first embodiment.

Figure 8:
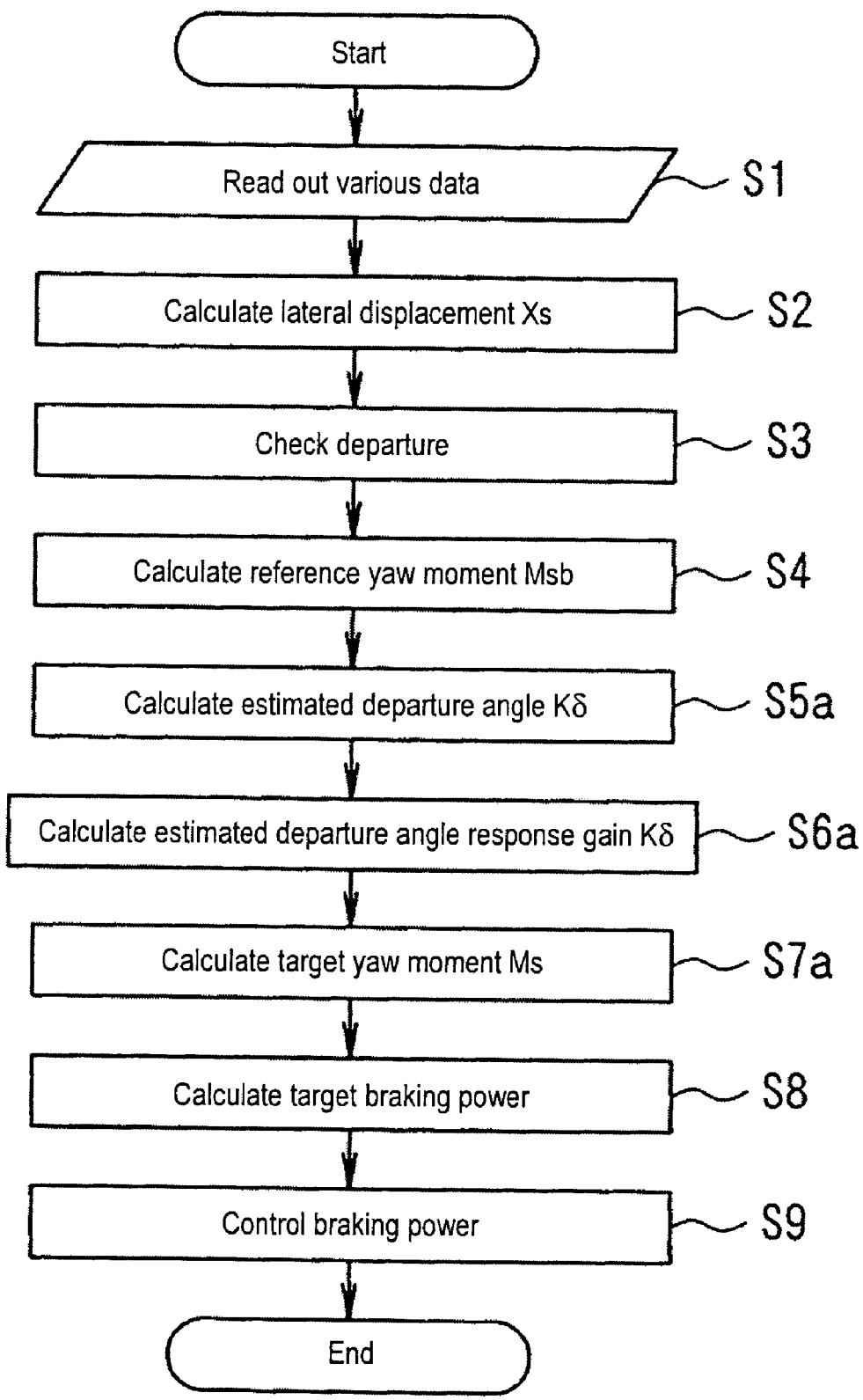
FIG. 8 is a flowchart illustrating an example of a computing process executed by a control unit according to a second embodiment.

In the second embodiment, the control unit 8 performs the computing process outlined in the flowchart of FIG. 8.

In FIG. 8, steps S1 to S4 are similar to the processes of steps S1 to S4 in FIG. 2. That is, a variety of data is read out (step S1), the current lateral displacement X is set as the lateral displacement Xs (step S2), and the monitoring of lane departure is performed by comparing the current lateral displacement Xs with the departure threshold value Xc (step S3). Then, the reference yaw moment Msb, corresponding to current lateral displacement Xs, is calculated (step S4).

Next, in step S5a, an estimated departure angle δ, which is the yaw angle of the vehicle, is calculated after a predetermined period of time has passed. Specifically, the estimated departure angle is calculated from Equation 9 using the current yaw angle φ and the road curvature ρ of the lane of travel.

$$\delta = \phi + Tt \times V \times \rho \qquad (9)$$

Tt denotes a headway period of time for calculating a front focal point distance, and the front focal point distance is obtained by multiplying the headway time Tt by the forward speed V of the vehicle. That is, the yaw angle after the headway time Tt has elapsed is the estimated departure angle δ.

Generally, some time is often required until the driver recognizes the alarm and acts to avoid lane departure. In addition, even when it is determined that the vehicle has a relatively strong tendency to depart from the lane of travel and the departure prevention control is initiated, the vehicle does not move toward the center of the lane of travel at once, but moves toward the outside of the lane of travel with a decreased speed of departure from the lane of travel until the vehicle is directed to the inside of the lane. As a result, in order to urge the driver to exercise control to prevent departure from the lane of travel with a margin, it is preferable that the headway time Tt be set to a value greater than "0" sec.

Next, in step S6a, an estimated departure angle response gain Kδ is calculated. Kδ is a gain for calculating the target yaw moment Ms corresponding to the estimated departure angle δ by multiplying the reference yaw moment Msb calculated in step S4, as described below. The estimated departure angle response gain Kδ is set based on the estimated departure angle δ of the vehicle with respect to the lane of travel after a predetermined period of time has elapsed and Kδ is set to increase as the estimated departure angle δ increases in the lane departing direction during the predetermined period of time.

Figure 9A:
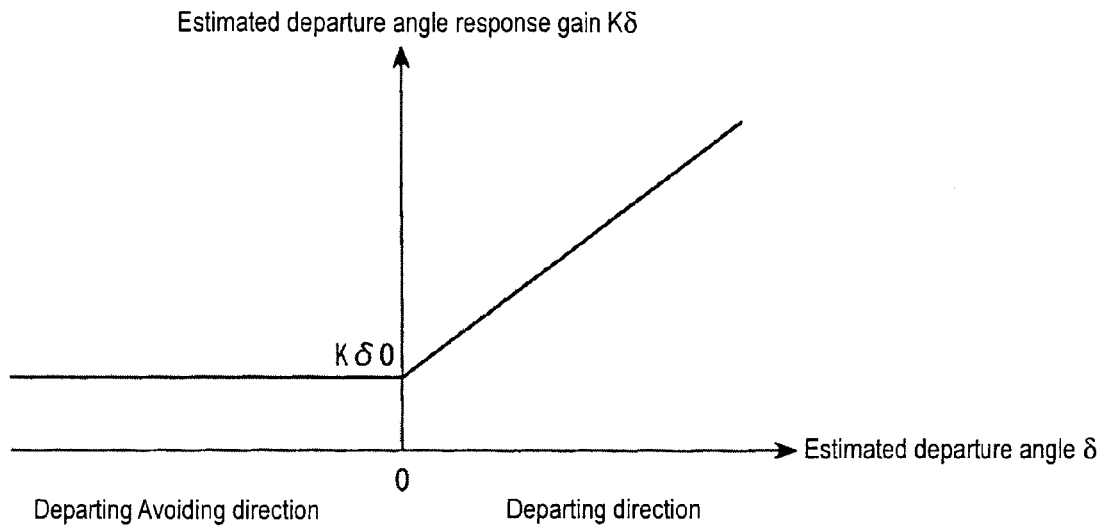
FIG. 9 is an example of a control chart showing the relationship between an estimated departure angle $\delta$ and an estimated-departure-angle response gain $K\delta$.

Specifically, when the departure monitoring result FLD in step S3 is "LEFT", the estimated departure angle response gain Kδ, corresponding to the estimated departure angle δ, is calculated, for example, according to the control chart shown in FIG. 9A. On the other hand, when the departure check result FLD is "RIGHT", Kδ is calculated, for example, according to the control chart shown in FIG. 9B.

Here, the estimated departure angle δ has a plus or positive value when the estimated departure angle with respect to the lane of travel indicates the left direction and a minus or negative value when the estimated departure angle indicates the right direction.

Figure 9B:
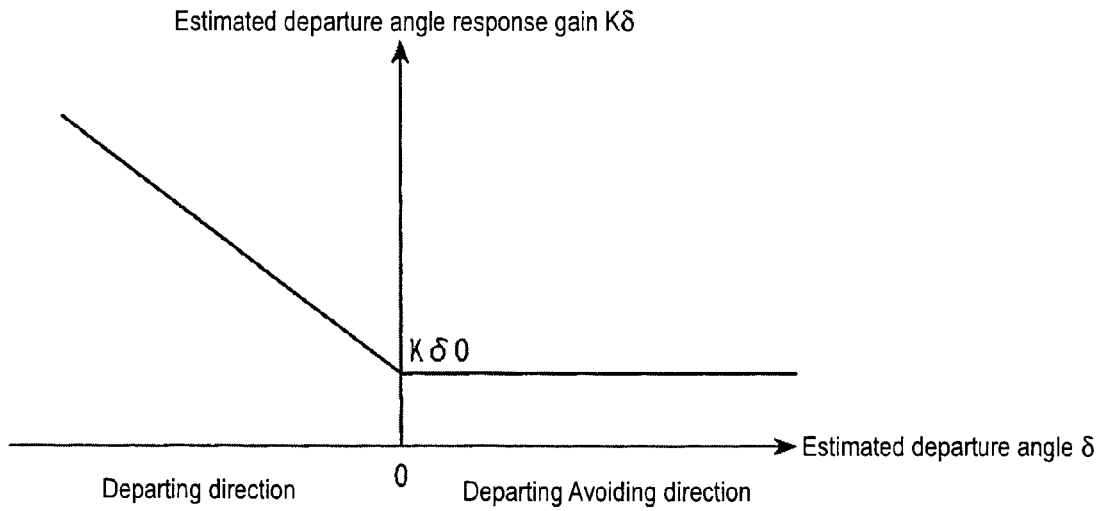

In FIGS. 9A and 9B, the abscissa axis is the estimated departure angle δ and the ordinate axis is the estimated departure angle response gain Kδ. As shown in FIGS. 9A and 9B, when the estimated departure angle δ is zero, the estimated departure angle response gain Kδ is set to an initial value Kδ0 greater than zero (for example, "1"). When the estimated departure angle δ is in the lane departing direction, Kδ increases from the initial value Kδ0 in proportion to the estimated departure angle δ. In the opposite circumstance, when the estimated departure angle δ is in the departure-avoiding direction, Kδ is set to the initial value Kδ0 regardless of the magnitude of the estimated departure angle δ. The initial value Kδ0 is not limited to "1" but may be set to any value depending upon the control effect expected of the departure avoidance control.

As shown in FIG. 9, when the estimated departure angle δ in the predetermined time is an angle in the lane departing direction and it is estimated that the vehicle has a relatively strong tendency of departing from the lane of travel in the future, the estimated departure angle response gain Kδ is set to a greater value as the estimated departure angle δ is greater; that is, as the tendency to depart from the lane is greater, and the target yaw moment Ms is set to a relatively large value, thereby generating a sufficient yaw moment. In the opposite circumstance, when the estimated departure angle δ in the predetermined time is an angle in the departure-avoiding direction; that is, in the direction in which the vehicle tends to avoid departing from the lane of travel in the future, Kδ is set to a relatively small value regardless of the magnitude of the estimated departure angle δ and the target yaw moment Ms is set to a relatively small value, thereby avoiding generation of an unnecessary yaw moment.

Figure 10A:
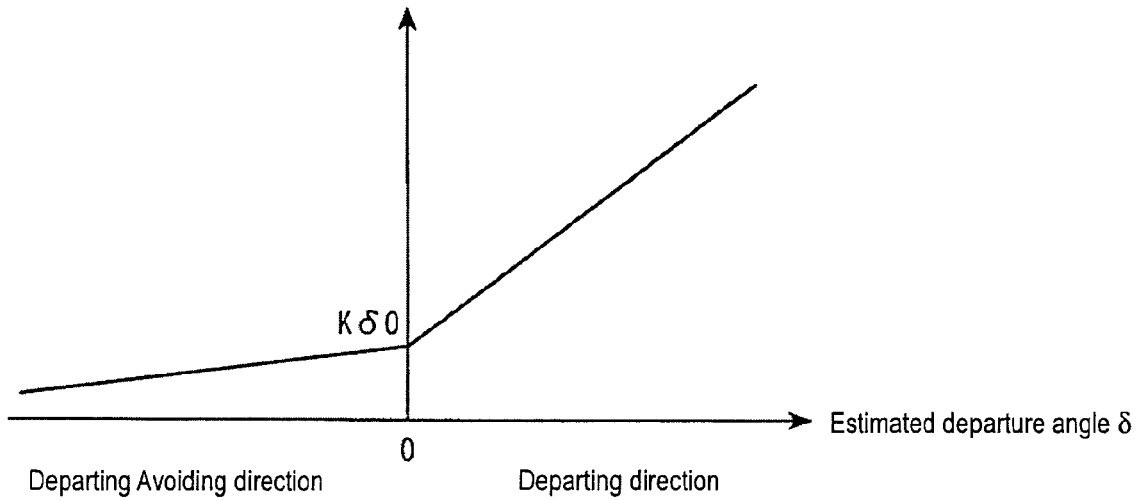
FIG. 10 is another example of a control chart showing the relationship between the estimated departure angle $\delta$ and the estimated-departure-angle response gain $K\delta$.
Figure 10B:
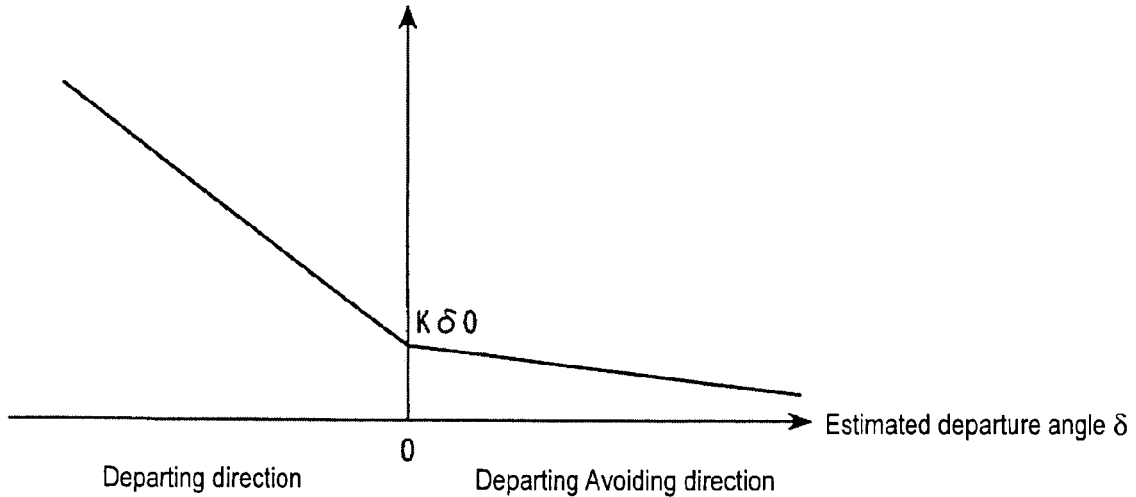

When the estimated departure angle δ is an angle in the departure-avoiding direction, the estimated departure angle response gain Kδ is set to the initial value Kδ0 regardless of the magnitude of the estimated departure angle δ, but the present system is not so limited. For example, as shown in FIGS. 10A and 10B, when the estimated departure angle δ is an angle in the departure-avoiding direction, the estimated departure angle response gain may be set to decrease from the initial value Kδ0 in inverse proportion to the estimated departure angle δ. That is, when the estimated departure angle δ is an angle in the departure-avoiding direction, the estimated departure angle response gain Kδ is set at a smaller value as the estimated departure angle δ is greater in the departure-avoiding direction; that is, as the yaw moment for changing the posture of the vehicle is not as necessary, thereby avoiding generation of an unnecessary yaw moment.

Figure 11A:
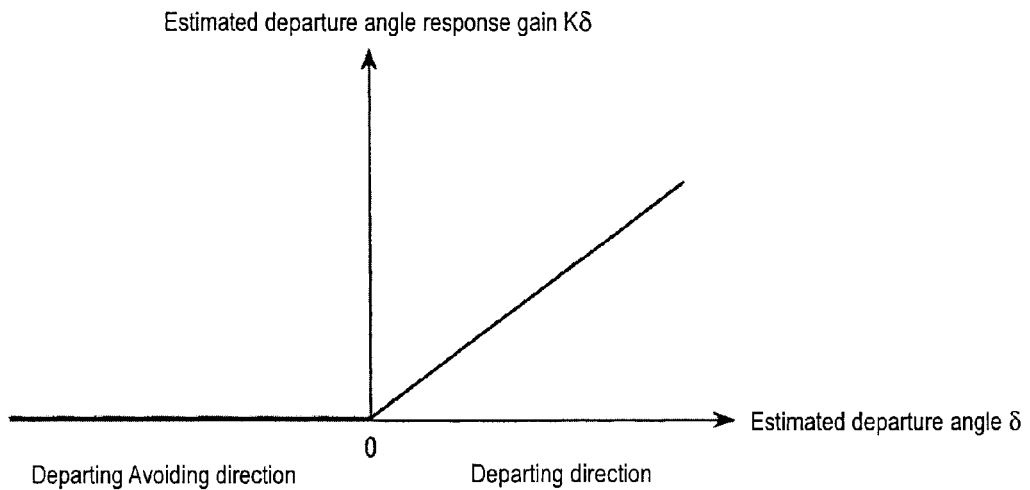
FIG. 11 is yet another example of a control chart showing the relationship between the estimated departure angle $\delta$ and the estimated-departure-angle response gain $K\delta$.
Figure 11B:
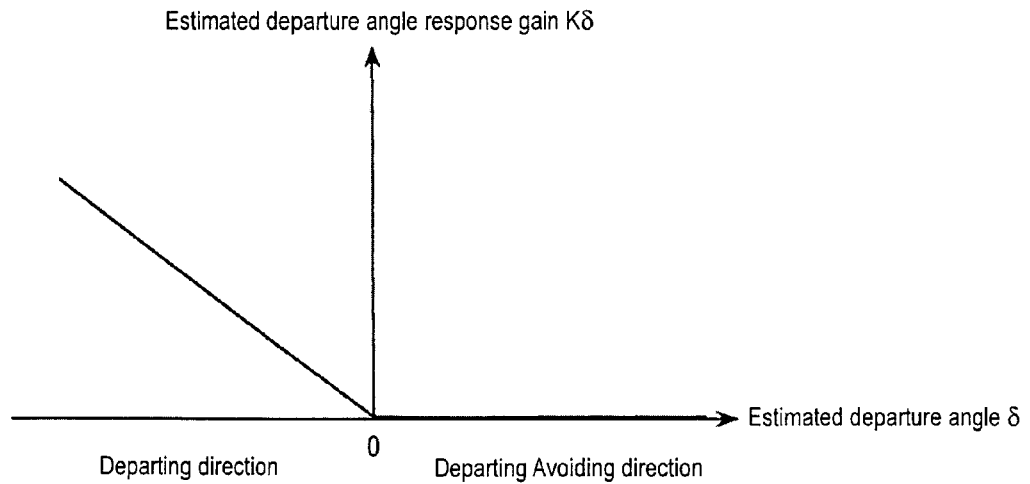

As shown in FIGS. 11A and 11B, the initial value of the estimated departure angle response gain Kδ may be set to zero when the estimated departure angle δ is zero, Kδ may be set to increase in proportion to the estimated departure angle δ when the estimated departure angle δ is in the lane departing direction, and Kδ may be set to zero regardless of the magnitude of the estimated departure angle δ when the estimated departure angle δ is in the departure-avoiding direction. That is, when the estimated departure angle δ is an angle in the departure-avoiding direction, it is not necessary to generate a yaw moment.

When the estimated departure angle response gain Kδ is calculated, the target yaw moment Ms generated in the vehicle to avoid lane departure is calculated in step S7a. Specifically, as shown in Equation 10, the target yaw moment is calculated by multiplying the estimated departure angle response gain Kδ, calculated in step S6a, by the reference yaw moment Msb, calculated in step S4.

$$Ms = Msb \times K\delta \qquad (10)$$

Next, in step S8, the target braking fluid pressures Psi (where i=FL to RR) of the respective wheels are calculated as target braking powers for avoiding lane departure through a procedure similar to that of the first embodiment, and the calculated target braking fluid pressures Psi are directed to the braking fluid pressure control circuit 7 (step S9).

In the second embodiment, when the departure flag FLD is "ON", the alarm unit for informing the driver of the tendency of the vehicle to depart from the lane may be actuated at the same time as the yaw moment is generated.

The computing process shown in FIG. 8 is thus completed. When a series of computing processes has been competed, the timer interruption process is ended and the predetermined main program is carried on again.

When the vehicle is traveling straight ahead in the vicinity of the center of the lane of travel, the current lateral displacement is calculated as zero since the current travel position of the vehicle is neither smaller than the lane departure monitoring threshold value Xc nor, greater than −Xc. Accordingly, the departure flag FLD is set to "OFF" and the reference yaw moment Msb is set to zero (Msb=0) (steps S1 to S4). As a result, the target yaw moment Ms becomes zero (Ms=0) and thus the yaw moment is not generated, thereby causing vehicle performance to be matched with the driver's manual control.

When the vehicle begins tending to depart to the left and the lateral displacement Xs is greater than or equal to the departure threshold value Xc, the departure flag FLD is set to "LEFT" and the difference between the lateral displacement Xs and the departure threshold value Xc; that is, the reference yaw moment Msb corresponding to the later lateral displacement of the vehicle, is calculated in step S4.

At this time, since the vehicle is departing to the left from the lane of travel, the departure angle δ estimated by Equation 9 is set to be equal to the current yaw angle φ, and the vehicle travels in a straight lane. The estimated departure angle response gain Kδ is set to a value corresponding to the magnitude of the estimated departure angle δ according to the control chart shown in FIG. 9A and the final target yaw moment Ms is calculated by multiplying Kδ by the reference yaw moment Msb corresponding to the current lateral displacement Xs.

At this time, as shown in FIG. 9A, the estimated departure angle response gain Kδ is set to a relatively large value as the estimated departure angle δ increases in the lane departing direction. Therefore, when it is estimated that the estimated departure angle δ in a predetermined period of time is relatively large and thus the vehicle has a relatively strong tendency of departing from the lane of travel in the future, the target yaw moment Ms is set to a sufficiently large value and a yaw moment is generated that is enough to change the posture of the vehicle in the departure-avoiding direction corresponding to the estimated departure angle δ, thereby preventing lane departure.

On the other hand, when the estimated departure angle δ is relatively small and it is estimated that the vehicle has a slight tendency to depart from the lane of travel in the future, the target yaw moment Ms is set to a relatively small value and a relatively small yaw moment is generated, thereby preventing lane departure.

When the yaw angle of the vehicle is decreased by generating the target yaw moment Ms or allowing the driver to perform steering manually, the target yaw moment Ms decreases with decreasing yaw angle.

When the posture of the vehicle is directed in the departure-avoiding direction upon a tendency to depart from the lane and the yaw angle becomes an angle in the departure-avoiding direction, as shown in the control chart shown in FIG. 9A, the estimated departure angle response gain $K\delta$ is set to the initial value $K\delta 0$. That is, at this time, since the yaw angle is in the departure-avoiding direction and the estimated departure angle $\delta$ during a predetermined period of time is maintained in the departure-avoiding direction, it is estimated that lane departure will not continue. Accordingly, even when the yaw moment has a relatively small value, there is no problem.

When the vehicle is traveling in a curved lane rather than a straight lane, the estimated departure angle $\delta$ is calculated based on the lane curvature $\rho$. Accordingly, for example, when the vehicle travels in a lane curved to the right and it is determined that the vehicle is tending to depart to the left, the vehicle has a relatively strong tendency to depart from the lane in the future. In this case, a greater value in the lane departing direction is calculated as the estimated departure angle $\delta$ according to the yaw angle $\phi$ and the estimated departure angle response gain $K\delta$ is set to a value corresponding to the magnitude of the estimated departure angle $\delta$ according to the control chart shown in FIG. 9A. Accordingly, when the magnitude of the yaw angle $\phi$ is not changed but the vehicle is traveling in a curved lane, the estimated departure angle $\delta$ is calculated as a comparatively greater value and the target yaw moment Ms is also set to a greater value, thereby generating a yaw moment greater than that when the vehicle is traveling in a straight lane. At this time, as the road curvature $\rho$ becomes greater, that is, as the curve becomes sharper, the estimated departure angle $\delta$ is calculated as a greater value in the lane departing direction, the estimated departure angle response gain $K\delta$ becomes greater, and the target yaw moment Ms is calculated to generate a necessary and sufficient yaw moment corresponding to the curvature of the road.

In the opposite circumstance, when it is estimated that the vehicle is tending to depart to the left while the vehicle is traveling in a lane curved to the left and the estimated departure angle $\delta$ during a predetermined period of time is calculated based on the current yaw angle $\phi$, the estimated departure angle $\delta$ is comparatively smaller than the yaw angle $\phi$ in the lane departing direction. This is because the yaw angle $\phi$ is in the lane departing direction but the vehicle is traveling in a curved lane.

As a result, the estimated departure angle response gain $K\delta$ is set to a value corresponding to the estimated departure angle $\delta$ according to of the control chart shown in FIG. 9A and $K\delta$ is smaller as the estimated departure angle $\delta$ is smaller. Accordingly, the target yaw moment Ms is set to a smaller value. Therefore, when the vehicle travels in a lane curved to the left and is tending to depart to the left, it is estimated that the vehicle has a small tendency to depart from the lane in the future. As a result, a yaw moment greater than necessary can be prevented from acting in the departure-avoiding direction opposite to the direction of the curved lane and thus can be avoided excessive change of the posture of the vehicle in the departure-avoiding direction.

In this case, since the current lateral displacement of the vehicle is set to the lateral displacement Xs and the tendency of lane departure is determined based on the lateral displacement, control interruption of the departure avoidance control is not carried out, as in the first embodiment. Accordingly, the range in which the driver can freely perform manual control can be sufficiently maintained.

At this time, since the estimated departure angle $\delta$ in the future is calculated and the target yaw moment Ms is calculated on the basis thereof, the yaw moment necessary at the point at which a predetermined period of time has elapsed can be calculated accurately.

Although the foregoing description regarding the above-mentioned embodiments assumes the vehicle is departing to the left from the lane of travel, the same description applies to lane departure to the right.

In addition, although it has been described in connection with the above-mentioned embodiments that the departure avoidance control means generates the yaw moment in the vehicle, the present system is not so limited. For example, control means may be employed for decelerating the vehicle when lane departure is detected and reducing the speed of the vehicle before the vehicle actually departs from the lane, and any method may be employed only if it accomplishes avoidance of lane departure.

In the second embodiment, the camera controller 14 corresponds to the traveling status detecting means and the road curvature detecting means, the processes of step S2 and step S3 in FIG. 8 correspond to the departure detecting means, the processes of steps S4 to S9 in FIG. 8 correspond to the departure avoidance control means, and the process of step S5a in FIG. 8 corresponds to the departure angle estimating means.

While the present lane departure prevention system has been described in connection with certain specific embodiments thereof, this is by way of illustration and not of limitation, and the appended claims should be construed as broadly as the prior art will permit.

What is claimed is:

1. A lane departure prevention system comprising:
 a traveling status detecting unit for detecting a current lateral displacement and a current yaw angle of a vehicle relative to a lane of travel;
 a departure detecting unit configured to determine that the vehicle is tending to depart from the lane of travel when the current lateral displacement is greater than a predetermined amount; and
 a departure avoidance control unit for controlling the vehicle to avoid lane departure when said departure detecting unit detects that the vehicle is tending to depart from the lane of travel,
 said departure avoidance control unit calculating an extent of control necessary to avoid lane departure on the basis of the current yaw angle of the vehicle such that the extent of control increases as the yaw angle increases in a lane departing direction.

2. A lane departure prevention system comprising:
 a traveling status detecting unit for detecting a current lateral displacement and a current yaw angle of a vehicle relative to a lane of travel;
 a departure detecting unit configured to determine that the vehicle is tending to depart from the lane of travel when the current lateral displacement is greater than a predetermined amount; and
 a departure avoidance control unit for controlling the vehicle to avoid lane departure when said departure detecting unit detects that the vehicle is tending to depart from the lane of travel,
 said departure avoidance control unit calculating an extent of control necessary to avoid lane departure on the basis of the current yaw angle of the vehicle, and wherein when the yaw angle is in a departure-avoiding direction, the departure-avoiding control unit calculates the extent of control to be smaller than that when the yaw angle is in a lane departing direction.

3. The lane departure prevention system according to claim 1, further including a road curvature detecting unit for detecting road curvature and a curve direction of the lane of travel,
wherein said departure avoidance control unit calculates the extent of control on the basis of the current yaw angle, and on the basis of the road curvature and the curve direction.

4. The lane departure prevention system according to claim 3, wherein said departure avoidance control unit calculates the extent of control to increase as the road curvature increases, when the vehicle is tending to depart outwardly from the curve direction.

5. The lane departure prevention system according to claim 1, wherein said departure avoidance control unit calculates a reference control extent on the basis of the current lateral displacement of the vehicle, and
wherein said departure avoidance control unit corrects the reference control extent on the basis of the current yaw angle and then calculates the extent of control necessary to avoid lane departure.

6. The lane departure prevention system according to claim 3, wherein said departure avoidance control unit calculates a reference control extent on the basis of the current lateral displacement of the vehicle, and
wherein said departure avoidance control unit corrects the reference control extent on the basis of the current yaw angle, the road curvature, and the curve direction and then calculates the extent of control necessary to avoid lane departure.

7. A lane departure prevention system comprising:
a traveling status detecting unit for detecting a current lateral displacement and a current yaw angle of a vehicle relative to a lane of travel;
a departure detecting unit for detecting whether the vehicle is tending to depart from the lane of travel on the sole basis of the current lateral displacement of the vehicle relative to the lane of travel;
a departure avoidance control unit for controlling the vehicle to avoid lane departure when said departure detecting unit detects that the vehicle is tending to depart from the lane of travel;
a road curvature detecting unit for detecting curvature of the lane of travel; and
a departure angle estimating unit for estimating a departure angle of the vehicle relative to the lane of travel after a predetermined period of time has passed on the basis of the current yaw angle of the vehicle and the road curvature,
said departure avoidance control unit calculating an extent of control necessary to avoid lane departure on the basis of the departure angle of the vehicle such that the extent of control increases as the estimated departure angle increases in a lane departing direction.

8. A lane departure prevention system comprising:
a traveling status detecting unit for detecting a current lateral displacement and a current yaw angle of a vehicle relative to a lane of travel;
a departure detecting unit for detecting whether the vehicle is tending to depart from the lane of travel on the sole basis of the current lateral displacement of the vehicle relative to the lane of travel;
a departure avoidance control unit for controlling the vehicle to avoid lane departure when said departure detecting unit detects that the vehicle is tending to depart from the lane of travel;
a road curvature detecting unit for detecting curvature of the lane of travel; and
a departure angle estimating unit for estimating a departure angle of the vehicle relative to the lane of travel after a predetermined period of time has passed on the basis of the current yaw angle of the vehicle and the road curvature,
said departure avoidance control unit calculating an extent of control necessary to avoid lane departure on the basis of the departure angle of the vehicle, and
wherein when the estimated departure angle is in a departure-avoiding direction, said departure avoidance control unit calculates the extent of control to be smaller than that when the estimated departure angle is in a lane departing direction.

9. The lane departure prevention system according to claim 7, wherein said departure avoidance control unit calculates a reference control extent on the basis of the current lateral displacement of the vehicle, and
wherein said departure avoidance control unit corrects the reference control extent on the basis of the estimated departure angle and then calculates the extent of control necessary to avoid lane departure.

10. The lane departure prevention system according to claim 1, wherein said departure avoidance control unit exercises control by generating a yaw moment in a direction in which the vehicle avoids lane departure.

11. The lane departure prevention system according to claim 1, wherein the departure detecting unit is configured to determine that the vehicle is tending to depart from the lane of travel based solely on the current lateral displacement of the vehicle.

12. The lane departure prevention system according to claim 1, wherein the departure detecting unit is configured to determine that the vehicle is tending to depart from the lane of travel without regard to the current yaw angle.

* * * * *